(12) United States Patent
Khiavi

(10) Patent No.: US 11,766,634 B2
(45) Date of Patent: Sep. 26, 2023

(54) PARALLEL PASSAGE CONTACTOR AND METHOD OF ADSORPTIVE GAS SEPARATION

(71) Applicant: INVENTYS THERMAL TECHNOLOGIES INC., Burnaby (CA)

(72) Inventor: Soheil Khiavi, Vancouver (CA)

(73) Assignee: Svante Inc., Burnaby (CA)

( * ) Notice: Subject to any disclaimer, the term of this patent is extended or adjusted under 35 U.S.C. 154(b) by 830 days.

(21) Appl. No.: 16/347,662

(22) PCT Filed: Nov. 8, 2017

(86) PCT No.: PCT/CA2017/051328
§ 371 (c)(1),
(2) Date: May 6, 2019

(87) PCT Pub. No.: WO2018/085927
PCT Pub. Date: May 17, 2018

(65) Prior Publication Data
US 2019/0329174 A1  Oct. 31, 2019

Related U.S. Application Data

(60) Provisional application No. 62/419,359, filed on Nov. 8, 2016.

(51) Int. Cl.
*B01D 53/02* (2006.01)
*B01D 53/04* (2006.01)
(Continued)

(52) U.S. Cl.
CPC ........ *B01D 53/0462* (2013.01); *B01J 20/103* (2013.01); *B01J 20/16* (2013.01);
(Continued)

(58) Field of Classification Search
CPC ........ B01D 2253/102; B01D 2253/106; B01D 2253/108; B01D 2253/204;
(Continued)

(56) References Cited

U.S. PATENT DOCUMENTS 5,082,473 A * 1/1992 Keefer .................... F02G 1/043
95/143
8,900,347 B2 12/2014 Boulet et al.
(Continued)

FOREIGN PATENT DOCUMENTS

| CA | 2592224 | 7/2006 |
|---|---|---|
| CA | 2824994 | 9/2012 |
| WO | WO 2005/032694 | 4/2005 |

OTHER PUBLICATIONS

International Search Report for PCT/CA2017/051328.
Written Opinion for PCT/CA2017/051328.
Extended European Search Report and Opinion from corresponding European Patent Application No. 17868695.2 dated Jun. 24, 2020, 8 pages.

*Primary Examiner* — Christopher P Jones
(74) *Attorney, Agent, or Firm* — Voyer Law

(57) ABSTRACT

An adsorptive gas separation apparatus and method is disclosed. An adsorbent structure may include a first adsorbent layer having at least a first adsorbent material, a second adsorbent layer including at least a second adsorbent material, and a barrier layer, where the barrier layer is interposed between the first adsorbent layer and the second adsorbent layer. A parallel passage contactor including a plurality of adsorbent structures each comprising a barrier layer, and arranged to form first and second fluid passages is also disclosed. An adsorption process for separating at least a first component from a multi-component fluid stream using the adsorbent structure is also provided.

11 Claims, 2 Drawing Sheets

(51) Int. Cl.
  *B01J 20/10* (2006.01)
  *B01J 20/16* (2006.01)
  *B01J 20/20* (2006.01)
  *B01J 20/22* (2006.01)
  *B01J 20/28* (2006.01)

(52) U.S. Cl.
  CPC ............ *B01J 20/20* (2013.01); *B01J 20/226* (2013.01); *B01J 20/28011* (2013.01); *B01J 20/28035* (2013.01); *B01D 2253/102* (2013.01); *B01D 2253/108* (2013.01); *B01D 2253/204* (2013.01); *B01D 2253/25* (2013.01)

(58) Field of Classification Search
  CPC ............ B01D 2253/25; B01D 2253/34; B01D 2258/0283; B01D 53/02; B01D 53/0462; B01J 20/103; B01J 20/16; B01J 20/20; B01J 20/226; B01J 20/28011; B01J 20/28035
  See application file for complete search history.

(56) References Cited

U.S. PATENT DOCUMENTS

| | | | |
|---|---|---|---|
| 8,940,072 B2 | 1/2015 | Boulet et al. | |
| 2004/0118287 A1* | 6/2004 | Jaffe | B01D 53/0423 96/121 |
| 2006/0169142 A1* | 8/2006 | Rode | B01D 53/02 96/129 |
| 2008/0282886 A1* | 11/2008 | Reyes | C10L 3/10 95/98 |
| 2011/0290109 A1* | 12/2011 | Khiavi | B01D 53/0473 96/115 |
| 2013/0152787 A1* | 6/2013 | Boulet | B01D 53/0462 95/91 |
| 2015/0135951 A1 | 5/2015 | Chen et al. | |
| 2015/0136316 A1 | 5/2015 | Chen et al. | |
| 2015/0139862 A1 | 5/2015 | Chen et al. | |
| 2018/0036673 A1* | 2/2018 | Sundaram | B01D 53/0407 |

* cited by examiner

PARALLEL PASSAGE CONTACTOR AND METHOD OF ADSORPTIVE GAS SEPARATION

This application claims priority of U.S. Provisional Patent Application 62/419,359, filed Nov. 8, 2016.

1. TECHNICAL FIELD

The present technology relates generally to apparatus and methods for adsorptive gas separation of a multi-component fluid mixture and systems incorporating the same. More particularly, the present technology relates to methods for adsorptive gas separation using a temperature swing adsorption process and a parallel passage contactor structure therefor, and additionally to systems incorporating the parallel passage contactor structure.

2. BACKGROUND OF THE INVENTION

Adsorptive gas separation processes and separators, for example, temperature swing adsorption and partial pressure swing adsorption processes and separators, are known in the art for use in adsorptive gas separation of multi-component fluid mixtures. One type of industrial process where gas separation may be desirable includes combustion processes, for example, where an oxidant and a carbon-containing fuel are combusted generating at least heat and a combustion gas stream (also known as a combustion flue gas stream). The separation of at least one component from the combustion gas stream may be desirable, including in, for example, post-combustion exhaust gas treatment systems.

A conventional temperature swing adsorptive gas separation process may typically employ two fundamental steps, an adsorption step and a regeneration or desorption step. During a typical adsorption step, a feed stream such as a multi-component fluid mixture may be admitted into an adsorptive separator and contactor comprising an adsorbent material, where the adsorbent material may adsorb a component of the feed stream, providing for separation of the adsorbed component from the remaining components of the feed stream. During a typical subsequent regeneration step, a regeneration or desorption fluid stream, for example, a heated air or steam stream, may be admitted into the adsorptive separator and contactor to increase the temperature of the adsorbent material, causing at least a portion of the adsorbed components to release or desorb from the adsorbent material to provide a desorbed component, and allow for cyclic reuse of the adsorbent material. Conventional adsorptive gas separators typically employ a single composition of one or more adsorbent materials throughout, such as in a conventional bed of beaded adsorbents, or an adsorbent contactor.

One shortcoming of conventional adsorptive gas separation processes and separators is the required steam and/or other source of energy consumed for desorption and regeneration of the adsorbent material which may typically represent a large portion of the operating cost of such adsorptive systems and processes. The high energy consumption and associated operating cost of desorption/regeneration in conventional adsorbent separators and processes may typically act as barriers to wide adaptation and implementation of conventional adsorptive gas separation technology. A further shortcoming of employing some conventional adsorbent materials such as zeolites or hydrophilic adsorbent materials in conventional adsorptive separators and processes may include, for example, a high affinity of such adsorbent materials for water or steam, where the presence of steam and/or water in the fluid to be separated or in the regeneration fluid may greatly reduce the adsorptive capacity of the adsorbent material for the target component. Furthermore, in a conventional adsorptive gas separation process, the exposure of certain adsorbent materials to the flow of some fluid streams, for example, a desorption fluid stream, through an adsorbent contactor may erode or wash the adsorbent material from the contactor, reducing the adsorptive capacity of the contactor over time.

Conventional adsorptive gas separators comprising parallel passage contactors are typically configured to have fluid inlet and outlet ports on two facets (such as the ends) of the parallel passage contactor. Such typical configuration may result in having the various fluid streams (for example, a feed stream and a desorption fluid stream, employed for of the adsorptive gas separation processes) travel through the parallel passage contactor, in contact with the adsorbent materials, at substantially a similar distance. For example, during an adsorption step of a conventional adsorptive gas separation processes employing conventional adsorptive gas separators comprising parallel passage contactors, a feed stream may be admitted into an adsorptive gas separator and a parallel passage contactor via an inlet port on a first facet of the contactor to travel through the parallel passage contactor at a first distance prior to recovery from the parallel passage contactor via an outlet port on a second facet, while during a desorption or regeneration step of a conventional adsorptive gas separation processes a regeneration or desorption fluid stream may be admitted into an adsorptive gas separator and a parallel passage contactor via an inlet port on the first or second facet of the parallel passage contactor to travel through the parallel passage contactor at substantially the same first distance prior to recovery from the parallel passage contactor via an outlet port on a first facet. Having the various fluid streams travel through the parallel passage contactor at substantially the same distance may result in, for example, a longer than desired residence time for one or more fluid streams, for example, a regeneration or desorption fluid stream or a cooling fluid stream, in a parallel passage contactor which may further result in the undesirable adsorption of components from, for example, a regeneration fluid stream or cooling fluid stream, onto the adsorbent material and decreasing the efficiency of the adsorptive gas separation process; erosion of the adsorbent material from the adsorbent contactor; a higher than desired pressure drop or loss across the adsorbent contactor for one or more fluid streams; and a limited ability to increase the efficiency of the contactor configuration and adsorptive gas separation process.

Accordingly, an adsorptive gas separation process and separator which may desirably address one or more of the shortcomings of conventional processes and systems is desired.

3. SUMMARY OF THE INVENTION

The concepts described herein, may be embodied as an adsorbent structure comprising a first adsorbent layer, a second adsorbent layer, and a barrier layer, wherein the barrier layer is interposed between the first adsorbent layer and the second adsorbent layer. The barrier layer optionally may include at least one of a metal, membrane, carbon, carbon molecular sieve, and graphene material. The first adsorbent layer may comprises a first adsorbent material, and the second adsorbent layer may comprise a second adsorbent material; and the first and second adsorbent materials may have different material compositions and/or physical characteristics.

The concepts may, in an alternate embodiment, include an adsorbent structure comprising a first adsorbent layer and a second adsorbent layer, wherein the first adsorbent layer is juxtaposed to the second adsorbent layer.

The concepts may, in a further embodiment, include a parallel passage contactor, comprising a plurality of adsorbent structures each comprising a first adsorbent layer juxtaposed to a second adsorbent layer, wherein the first adsorbent layer comprises a first adsorbent material and the second adsorbent layer comprises a second adsorbent material; a first fluid passage where at least a portion of the first fluid passage is bounded by the first adsorbent layer; and a second fluid passage where at least a portion of the second fluid passage is bounded by the second adsorbent layer. In some variations, a barrier layer may be interposed between the first adsorbent layer and the second adsorbent layer.

The concepts may also be embodied as an adsorptive gas separation process for separating at least a first component from a multi-component fluid stream, the process comprising:
(i) admitting the multi-component fluid stream into a first fluid passage and a second fluid passage of a parallel passage contactor comprising a first adsorbent layer having a first adsorbent material and a second adsorbent layer having a second adsorbent material, wherein the first adsorbent layer defines at least a portion of a first fluid passage and the second adsorbent layer defines at least a portion of a second fluid passage;
(ii) adsorbing at least a portion of the first component of the multi-component fluid stream on the second adsorbent material of the second adsorbent layer defining at least the portion of the second fluid passages;
(iii) recovering a first product stream at least periodically depleted in the first component relative to the multi-component fluid stream from the first fluid passage and the second fluid passage of the parallel passage contactor;
(iv) admitting a desorption fluid stream into the first passage of the parallel passage contactor;
(v) desorbing at least a portion of the first component adsorbed on the second adsorbent material of the second adsorbent layer by heating the second adsorbent material by at least one of: transferring heat from the desorption fluid stream and the first adsorbent layer to the second adsorbent material of the second adsorbent layer, and diffusing at least a portion of the desorption fluid stream through the first adsorbent layer to contact the second adsorbent material of the second adsorbent layer and liberating a heat of adsorption, and
(vi) recovering a second product stream at least periodically enriched in the first component relative to the multi-component fluid stream from the second fluid passage of the parallel passage contactor.

The concepts may alternatively be embodied as an adsorptive gas separation process for separating at least a first component from a multi-component fluid stream comprising:
(i) admitting the multi-component fluid stream into a fluid passage of a parallel passage contactor comprising an adsorbent material on a plurality of adsorbent layers, where at least one of the adsorbent material and the plurality of adsorbent layers define at least a portion of the fluid passage of the parallel passage contactor and the multi-component fluid stream contacts the adsorbent material on the plurality of adsorbent layers for a first distance;
(ii) adsorbing at least a portion of the first component on the adsorbent material on the plurality of adsorbent layers;
(iii) recovering a first product stream at least periodically depleted in the first component relative to the multi-component fluid stream from the fluid passage of the parallel passage contactor via the second port;
(iv) admitting a desorption fluid stream into the fluid passage of the parallel passage contactor via the third port where said desorption fluid stream contacts the adsorbent material on the plurality of adsorbent layers for a second distance;
(v) desorbing at least a portion of the first component adsorbed on the adsorbent material on the plurality of adsorbent layers; and
(vi) recovering a second product stream at least periodically enriched in the first component relative to the multi-component fluid stream from the fluid passage of said parallel passage contactor via the fourth port,
wherein the first distance is greater than said second distance.

The concepts may additionally be embodied as a parallel passage contactor comprising a plurality of an adsorbent layer where the adsorbent layer further comprise an adsorbent material where the plurality of the adsorbent layers define at least a portion of a fluid passage of the parallel passage contactor; a first port and a second port fluidly connected to the fluid passage, configured on a perimeter of the plurality of adsorbent layer and separated by a first distance; and a third port and a fourth port fluidly connected to the fluid passage, configured on the perimeter of the plurality of adsorbent layer and separated by a second distance, wherein the first distance is greater than the second distance.

4. BRIEF DESCRIPTION OF THE DRAWINGS

The apparatus and methods for adsorptive gas separation of at least one fluid component from a multi-component fluid mixture according to various embodiments of the present disclosure will now be described with reference to the accompanying drawing figures, in which.

Like reference numerals refer to corresponding parts throughout the several views of the drawings.

5. DETAILED DESCRIPTION OF THE INVENTION

Figure 1:
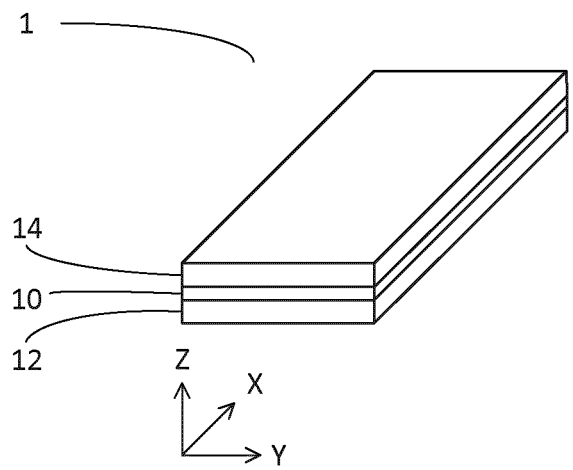
FIG. 1 is a perspective view illustrating an adsorbent structure according to an embodiment of the present invention.

FIG. 1 illustrates a perspective view of an exemplary adsorbent structure 1 in accordance with an embodiment of the invention, which may be employed in an exemplary parallel passage contactor and an associated adsorptive gas separator such as to implement an adsorptive gas separation process as described herein, in accordance with another embodiment of the present invention. Adsorbent structure 1, comprises an optional barrier layer 10, interposed between a first adsorbent layer 12, and a second adsorbent layer 14. First adsorbent layer 12 comprises one or more adsorbent materials, for example, a first adsorbent material. Second adsorbent layer 14 comprises one or more adsorbent materials, for example, a second adsorbent material. The first adsorbent material may (but need not) comprise at least one of a material composition, physical characteristic and/or property which differs from those in the second adsorbent material. In one aspect, barrier layer 10 may desirably comprise a suitably thermally conductive material, such that heat transfer from one of first and second adsorbent layers 12 and 14 to the other through the barrier layer 10 may be facilitated by the thermal conductivity of the barrier layer 10. For example, barrier layer 10 may desirably comprise a suitable thermally conductive material having a high thermal conductivity across a thickness of barrier layer 10, such as in a direction substantially along the Z axis illustrated in FIG. 1. In one embodiment, barrier layer 10 may desirably comprise a material which may be suitably high in thermal conductivity (which may be expressed using a unit of measure of watts per meter kelvin, herein referred to as "W/m·K") so as to facilitate heat transfer across a thickness of barrier layer 10. In one such aspect, barrier layer 10 may comprise a thermally conductive material desirably having a thermal conductivity of equal to or greater than a desired thermal conductivity threshold of, for example, about 10 W/m·K, or particularly about 100 W/m·K or more particularly about 200 W/m·K.

In one embodiment according to the present invention, during an adsorptive gas separation process, barrier layer 10 may desirably enable rapid and efficient transfer of heat while desirably reducing or controlling the transfer of fluids, for example, gasses and/or water in the form of steam, through a thickness of barrier layer 10 (in a direction substantially along the Z axis illustrated in FIG. 1) or between first adsorbent layer 12 and second adsorbent layer 14. In one embodiment, barrier layer 10 may desirably comprise a material which may be suitably high in thermal conductivity (which may be expressed using a unit of measure of watts per meter kelvin, herein referred to as "W/m·K") so as to facilitate heat transfer across the thickness of barrier layer 10. In one such aspect, barrier layer 10 may comprise a thermally conductive material desirably having a thermal conductivity of equal to or greater than a desired thermal conductivity threshold of, for example, about 10 W/m·K, or particularly about 100 W/m·K or more particularly about 200 W/m·K. In a particular embodiment, barrier layer 10 may comprise a material which is desirably low in permeability to one or more gas (and/or water in the form of steam) or other fluid, such as a barrier material which desirably has a permeability within a desired permeability range, enabling barrier layer 10 to function as a diffusion retarder or barrier which may be, for example, semi-impermeable or substantially impermeable to one or more gasses or fluids such as, for example, water in the form of steam. In one such embodiment, the barrier layer 10 may comprise a material which is semi-impermeable to one or more gas (and/or water in the form of steam) so as to provide for a desirably controlled rate of transfer of one or such gas between first and second adsorbent layers 12, 14, through a thickness of barrier layer 10, for example, in a direction substantially along the Z axis illustrated in FIG. 1.

In one embodiment according to the present invention, employing a barrier layer for example, barrier layer 10, suitably high in thermal conductivity and low in permeability (or specifically substantially impermeable) may advantageously enable an embodiment adsorptive gas separation process where regeneration or desorption of one or more components adsorbed on one or more adsorbent materials of both adsorbent layers may be provided by admitting a regeneration or desorption fluid (for example, a steam stream, an air stream, an inert gas stream, a fluid stream comprising substantially the first component, a combustion flue gas stream) comprising one or more components (for example, water or carbon dioxide) into an adsorptive gas separator, parallel passage contactor, and/or fluid passage to come in contact with the one or more adsorbent materials of substantially one adsorbent layer, for example, a first adsorbent material of first adsorbent layer 12, on a first side of the barrier layer. This may result in advantageously reducing the exposure or contact of the regeneration or desorption fluid with the one or more adsorbent materials of the adsorbent layer on an opposing or a second side of the barrier layer, for example, a second adsorbent material of second adsorbent layer 14, which may further result in advantageously reducing the loss of adsorptive capacity of the one or more adsorbent material of the adsorbent layer on the opposing or second side of the barrier layer, for example, second adsorbent material of second adsorbent layer 14, due to adsorption of one or more components or species of the regeneration or desorption fluid, contamination of the adsorbent material, and/or loss of adsorbent materials of an adsorbent layer, for example, second adsorbent material of second adsorbent layer 14, due to erosion or washing of the adsorbent material from the adsorbent layer.

In one embodiment according to the present invention, employing a barrier layer (for example, barrier layer 10) suitably high in thermal conductivity with a selected and/or controlled permeability may advantageously enable an embodiment adsorptive gas separation process where regeneration or desorption of components adsorbed on one or more adsorbent materials, for example, first adsorbent material and second adsorbent material, of the adsorbent layers, for example, first adsorbent layer and second adsorbent layer, adjacent to both sides of the barrier layer may be provided by admitting a regeneration or desorption fluid (for example, a steam stream, an air stream, an inert gas stream, a fluid stream comprising substantially the first component, a combustion flue gas stream) comprising one or more components or species (for example, water or carbon dioxide) into an adsorptive gas separator, parallel passage contactor, and/or fluid passage to come in contact with the one or more adsorbent materials of substantially one adsorbent layer (for example, first adsorbent material of first adsorbent layer 12) adjacent to a first side of the barrier layer (for example, barrier layer 10) while controlling and/or providing for a small quantity of one or more components or species of the desorption or regeneration fluid to diffuse through the barrier layer and come in contact with the one or more adsorbent materials of the adsorbent layer adjacent to an opposing or a second side of the barrier layer, for example, second adsorbent material of second adsorbent layer 14. This may advantageously assist in generating heat (due to components or species of the desorption or regeneration stream diffusing through barrier layer and adsorbing onto the one or more adsorbent materials of the adsorbent layer adjacent to the opposing or second side of the barrier layer, for example, second adsorbent material of second adsorbent layer 14, generating or liberating a heat of adsorption) which may be employed for desorption of the first component adsorbed on the adsorbent material, while advantageously substantially reducing the contamination and/or loss of adsorptive capacity of the one or more adsorbent material of the adsorbent layer adjacent to the opposing or second side of the barrier layer (for example, second adsorbent layer 14) and/or advantageously reducing the amount of regeneration or desorption fluid admitted into an parallel passage contactor and/or fluid passage which may further result in reducing the energy consumption, capital cost, and/or operating cost of the adsorptive gas separation process and adsorptive gas separator.

In one embodiment, permeability may be expressed using a unit of measure of square meter (herein referred to as "$m^2$"). In one such aspect, barrier layer 10 may comprise a selectively and/or controllably permeable material desirably having a permeability value which may be measured substantially across a thickness of barrier layer 10 or in a direction between the first and second adsorbent layers (for example, in a direction substantially along the Z axis illustrated in FIG. 1) of equal to or less than a desired permeability threshold, for example, equal to or less than about a permeability value of at least one of a first adsorbent layer and/or a second adsorbent layer, or equal to or less than about $10^{-6}$ $m^2$, particularly equal to or less than about $10^{-8}$ $m^2$, more particularly equal to or less than about $10^{-12}$ $m^2$, even more particularly equal to or less than about $10^{-13}$ $m^2$. In another such aspect, barrier layer 10 may comprise a selectively permeable material desirably having a permeability value which may be measured substantially across a thickness of barrier layer 10 or in a direction between the first and second adsorbent layers (for example, in a direction substantially along the Z axis illustrated in FIG. 1) within a desired permeability range threshold of, for example, about $10^{-6}$ $m^2$ to $10^{-17}$ $m^2$, particularly about $10^{-8}$ $m^2$ to $10^{-15}$ $m^2$, more particularly about $10^{-12}$ $m^2$ to $10^{-15}$ $m^2$, or yet more particularly about $10^{-13}$ $m^2$ to $10^{-15}$ $m^2$. In one aspect, suitable materials for employment as barrier layer 10 may include but are not limited to one or more of: metals and metal alloys such as aluminum and aluminum alloys, membranes, polymers, or carbon materials such as carbon molecular sieve, graphite oxide, graphene, graphene flakes, exfoliated graphene and exfoliated graphene flakes, for example.

In one embodiment, barrier layer 10 may also desirably have a low thermal capacity to allow for a rapid change in temperature and to further facilitate transfer of heat between adsorbent layers 12 and 14, which may be achieved, for example, by configuring barrier layer 10 in the form of a substantially thin film with a thickness, for example, in a direction substantially along the Z axis illustrated in FIG. 1, of equal to or less than a desired thickness threshold, such as having a thickness of, equal to or less than about 1000 microns (herein referred as μm), or more particularly equal to or less than about 100 μm, or yet more particularly equal to or less than about 10 μm, or even more particularly equal to or less than about 5 μm.

In one embodiment, adsorbent structure 1 comprises first adsorbent layer 12 which may comprise one or more adsorbent materials, for example, a first adsorbent material, and second adsorbent layer 14 which may comprise one or more adsorbent materials, for example, a second adsorbent material. In one such embodiment, first adsorbent layer 12 and second adsorbent layer 14 are in thermal communication through, in direct contact with, and separated by an optional barrier layer, for example, barrier layer 10. In one such embodiment, the first adsorbent material comprised in first adsorbent layer 12 and the second adsorbent material comprised in second adsorbent layer 14 further comprises a material composition, a physical characteristics and/or properties such as for example, ability to exclude or repel water molecules (which may be expressed by the term hydrophobicity), permeability, or pore size, where at least one of material composition, a physical characteristics and/or properties of the first adsorbent material of the first adsorbent layer is dissimilar or differs from the at least one of material composition, a physical characteristics and/or properties of the second adsorbent material of the second adsorbent layer 14. For example, in one embodiment, first adsorbent layer 12 may comprise at least a first adsorbent material such as, an activated carbon adsorbent material, polyethyleneimine doped silica adsorbent material, a hydrophobic zeolite adsorbent material, a hydrophobic adsorbent material, or an adsorbent material with a greater hydrophobicity (relative to a second adsorbent material comprised in second adsorbent layer 14). In one such embodiment, second adsorbent layer 14 may comprise at least an adsorbent material, for example, a second adsorbent material, such as, a (hydrophilic) zeolite adsorbent material, a hydrophilic adsorbent material, or an adsorbent material with a lesser hydrophobicity (relative to an adsorbent material employed as a first adsorbent material comprised in first adsorbent layer 12). Alternatively, first adsorbent layer 12 may comprise at least an adsorbent material which is a hydrophilic adsorbent material or an adsorbent material with a lesser hydrophobicity relative to an adsorbent material comprised in second adsorbent layer 14, which may comprise at least one adsorbent material which is a hydrophobic adsorbent material, or an adsorbent material with a greater hydrophobicity relative to the adsorbent material of the first adsorbent layer 12. In one embodiment, first adsorbent layer 12 and second adsorbent layer 14 may desirably have a high gas permeability, or a gas permeability value which may be measured substantially across a thickness (in a direction substantially along the Z axis illustrated in FIG. 1) of first adsorbent layer 12 and/or second adsorbent layer 14, of equal to or greater than a desired permeability threshold of, for example, equal to or greater than about $10^{-12}$ $m^2$, or particularly equal to or greater than about $10^{-11}$ $m^2$. In another such aspect, first adsorbent layer 12 and second adsorbent layer 14 may desirably have a permeability value which may be measured substantially across a thickness (in a direction substantially along the Z axis illustrated in FIG. 1) of first adsorbent layer 12 and/or second adsorbent layer 14, within a desired permeability range threshold of, for example, about $10^{-6}$ $m^2$ to $10^{-13}$ $m^2$, particularly about $10^{-7}$ $m^2$ to $10^{-12}$ $m^2$, or more particularly about $10^{-8}$ $m^2$ to $10^{-11}$ $m^2$.

Optionally, thermally conductive materials may be employed within and/or on a first adsorbent layer and/or second adsorbent layer of an adsorbent structure. In one such embodiment, thermally conductive materials may be substantially continuous or non-continuous, optionally in direct contact with one or more adsorbent materials, oriented or configured in an longitudinal (substantially parallel to along the X axis illustrated in FIG. 1) and/or lateral (substantially parallel to along the Y axis illustrated in FIG. 1) direction and/or any direction between longitudinal and lateral directions in relation to an adsorbent layer and/or a direction of flow of a fluid stream, for example, a multi-component fluid stream or feed stream, a desorption/regeneration fluid stream, a purge fluid stream, and/or a cooling fluid stream within a parallel passage contactor. For example, thermally conductive materials may be employed and configured within and/or on a first adsorbent layer 12 of an adsorbent structure 1 to transfer heat in a substantially longitudinal direction (substantially parallel to the X axis illustrated in FIG. 1) of adsorbent structure 1, and/or thermally conductive materials may be employed and configured within and/or on a second adsorbent layer 14 of adsorbent structure 1 to transfer heat in a substantially lateral direction (substantially parallel to the Y axis illustrated in FIG. 1) of adsorbent structure 1; or thermally conductive materials may be employed and configured within and/or on first adsorbent layer 12, and/or second adsorbent layer 14 of adsorbent structure 1 to transfer heat in a substantially longitudinal direction (substantially parallel to the X axis illustrated in FIG. 1) of adsorbent structure 1 and/or a substantially lateral direction (substantially parallel to the Y axis illustrated in FIG. 1) of adsorbent structure 1. In one embodiment, thermally conductive materials may desirably be substantially continuous and/or extent substantially from end-to-end or facet-to-facet, (substantially parallel to the X axis and/or Y axis illustrated in FIG. 1) of an adsorbent layer of an adsorbent structure. In another embodiment, thermally conductive materials may be discontinuous or periodic in extent in at least one of longitudinal and lateral directions. In one embodiment, suitable thermally conductive materials may include, but are not limited to, carbon filaments, carbon cloth, metal filaments and metallic films or foils, or combinations thereof, for example. Exemplary adsorbent contactor structures employing exemplary thermally conductive materials within and/or in contact with an adsorbent material are disclosed in Applicant's U.S. patent application Ser. No. 13/203,714, now granted as U.S. Pat. No. 8,940,072 entitled "PARALLEL PASSAGE FLUID CONTACTOR STRUCTURE" and U.S. patent application Ser. No. 13/819,319, now granted as U.S. Pat. No. 8,900,347 entitled "METHOD OF ADSORPTIVE GAS SEPARATION USING THERMALLY CONDUCTIVE CONTACTOR STRUCTURE", the contents of which are herein incorporated in their entirety for all purposes. Both U.S. patent application Ser. No. 13/203,714 and U.S. patent application Ser. No. 13/819, 319 disclose a contactor comprising parallel fluid flow passages oriented in a longitudinal direction, cell walls between each adjacent fluid flow passages, and axially continuous thermally conductive filaments embedded within or situated between cell wall surfaces, where the thermally conductive filaments may transfer thermal energy in the longitudinal direction of the contactor. For example, U.S. patent application Ser. No. 13/203,714 and U.S. patent application Ser. No. 13/819,319 disclose a contactor comprising thermally conductive filaments orientated in a longitudinal direction (in a direction substantially along or parallel to the X axis illustrated in FIG. 1) which may transfer thermal energy in the longitudinal direction.

In one aspect, an exemplary adsorbent structure 1 may comprise a first adsorbent layer 12 having at least a first adsorbent material (for example, activated carbon, polyethyleneimine doped silica, or a hydrophobic zeolite adsorbent material, and optionally a suitable binder material) supported on an optional thermally conductive material or adsorbent support within the first adsorbent layer, which may comprise, a carbon, graphene, metal, or other thermally conductive material in a form of a cloth, mesh, mat, or sheet for example; a second adsorbent layer 14 having at least a second adsorbent material (for example, a hydrophilic zeolite, a zeolite, or a metal organic framework (MOF) adsorbent material, and optionally a suitable binder material, and supported on an optionally thermally conductive material or adsorbent support, which may comprise a carbon, graphene, metal, or other thermally conductive material in a form of a cloth, mesh, mat or sheet for example; and a barrier layer 10 between the first adsorbent layer 12 and second adsorbent layer 14. In one embodiment barrier layer 10 may comprise a substantially impermeable, selectively permeable or controllably permeable or other suitable barrier layer material, such as may be operable to retard and/or control diffusion of at least one gas or liquid species between first and second adsorbent layers 12 and 14, or through a thickness of barrier layer 10, for example, in a direction substantially along the Z axis illustrated in FIG. 1. In one embodiment, barrier layer 10 may comprise at least one of a metal (such as aluminum foil), membrane, carbon, and graphene (such as graphene flake) material. In a particular embodiment, barrier layer 10 may comprise a thickness of equal to or less than about 5 μm and a permeability of equal to or less than about $10^{-8}$ m$^2$ with respect to at least one desired gas or fluid species, such as steam, for example. In one such embodiment, the adsorbent structure may advantageously enable employment of hydrophilic adsorbent materials including, for example, hydrophilic zeolites, as at least a portion of the total quantity of adsorbent materials in an adsorbent structure, in adsorptive gas separation processes which employs steam as a desorption/regeneration fluid, for example. A barrier layer may be employed to substantially separate and protect an adsorbent material, for example, a hydrophilic adsorbent material, of an adsorbent layer (configured on an opposing side of a barrier layer where a desorption or regeneration fluid, for example, a steam stream, may come in direct contact with) from direct contact with a desorption or regeneration fluid which upon contact may typically deactivate, saturate, and/or contaminate the one or more adsorbent materials of the adsorbent layer or specifically the hydrophilic adsorbent material of the adsorbent layer.

In one embodiment an adsorbent structure, for example, adsorbent structure 1, comprises:

1) a first adsorbent layer, for example, first adsorbent layer 12, comprising one or more adsorbent materials and at least one of:

a suitable binder material;

an adsorbent support for example, in a form of a cloth, a mesh, or a sheet, optionally comprising a thermally conductive material, for example, a carbon material, a graphene material, a metal material;

an adsorbent material further comprising an activated carbon adsorbent material, polyethyleneimine doped silica adsorbent material, a hydrophobic zeolite adsorbent material, or a hydrophobic adsorbent material;

an adsorbent material having an adsorbent material composition, physical characteristic and/or property, for example, hydrophobicity, permeability, or pore size, where at least one of adsorbent material composition, physical characteristic and/or property differs from the at least one of adsorbent material composition, physical characteristic and/or property of an adsorbent material in a second adsorbent layer;

a permeability value substantially across a thickness of the first adsorbent layer, for example, in a direction substantially along the Z axis illustrated in FIG. 1, of equal to or greater than a desired permeability threshold, for example, equal to or greater than a desired permeability threshold of, for example, equal to or greater than about $10^{-12}$ m$^2$, or particularly equal to or greater than about $10^{-11}$ m$^2$;

a permeability value substantially across a thickness of the first adsorbent layer, for example, in a direction substantially along the Z axis illustrated in FIG. 1, within a desired permeability range threshold, for example, about $10^{-6}$ m$^2$ to $10^{-13}$ m$^2$, particularly about $10^{-7}$ m$^2$ to $10^{-12}$ m$^2$, or more particularly about $10^{-8}$ m$^2$ to $10^{-11}$ m$^2$;

a thermally conductive material substantially continuous or non-continuous, optionally in direct contact with one or more adsorbent materials, oriented or configured in a longitudinal (for example, substantially along or parallel to the X axis illustrated in FIG. 1) and/or lateral (for example, substantially parallel to the Y axis illustrated in FIG. 1) direction or any direction between longitudinal and lateral directions;

a thermally conductive material including, for example, carbon filaments, carbon cloth, carbon mesh, metal filaments and metallic films or foils, or combinations thereof.

2) a second adsorbent layer, for example, second adsorbent layer 14, comprising one or more adsorbent materials and at least one of:

a suitable binder material;

an adsorbent support for example, in a form of a cloth, a mesh, or a sheet, optionally comprising a thermally conductive material, for example, a carbon material, a graphene material, a metal material;

an adsorbent material further comprising a (hydrophilic) zeolite adsorbent material, a hydrophilic adsorbent material or a metal organic framework (MOF) adsorbent material;

an adsorbent material having an adsorbent material composition, physical characteristic and/or property, for example, hydrophobicity, permeability, or pore size, where at least one of adsorbent material composition, physical characteristic and/or property differs from the at least one of adsorbent material composition, physical characteristic and/or property of an adsorbent material in a first adsorbent layer;

a permeability value substantially across a thickness of the second adsorbent layer, for example, in a direction substantially along the Z axis illustrated in FIG. 1, of equal to or greater than a desired permeability threshold, for example, equal to or greater than a desired permeability threshold of, for example, equal to or greater than about $10^{-12}$ m$^2$, or particularly equal to or greater than about $10^{-11}$ m$^2$;

a permeability value substantially across a thickness of the second adsorbent layer, for example, in a direction substantially along the Z axis illustrated in FIG. 1, within a desired permeability range threshold, for example, about $10^{-6}$ m$^2$ to $10^{-13}$ m$^2$, particularly about $10^{-7}$ m$^2$ to $10^{-12}$ m$^2$, or more particularly about $10^{-8}$ m$^2$ to $10^{-11}$ m$^2$;

a thermally conductive material substantially continuous or non-continuous, optionally in direct contact with one or more adsorbent materials, oriented or configured in a longitudinal (for example, substantially along or parallel to the X axis illustrated in FIG. 1) and/or lateral (for example, substantially parallel to the Y axis illustrated in FIG. 1) direction or any direction between longitudinal and lateral directions, and a thermally conductive material including, for example, carbon filaments, carbon cloth, carbon mesh, metal filaments and metallic films or foils, or combinations thereof.

3) optionally, a barrier layer, for example, barrier layer 10, interposed between, in thermal communication and in direct contact with the first adsorbent layer and the second adsorbent layer, comprising at least one of:

a thermally conductive material desirably having a thermal conductivity of equal to or greater than a desired thermal conductivity threshold of, for example, about 10 W/m·K, or particularly about 100 W/m·K or more particularly about 200 W/m·K;

a material which is substantially impermeable to one or more gas (and/or water in the form of steam) or other fluid;

a material which is semi-impermeable to one or more gas (and/or water in the form of steam) or other fluid;

a permeability value substantially across a thickness of the barrier layer or in a direction between the first and second adsorbent layers (for example, in a direction substantially along the Z axis illustrated in FIG. 1) of equal to or less than a desired permeability threshold, for example, equal to or less than about a permeability value a first adsorbent layer, equal to or less than about a permeability value a second adsorbent layer, or equal to or less than about $10^{-6}$ m$^2$, particularly equal to or less than about $10^{-8}$ m$^2$, more particularly equal to or less than about $10^{-12}$ m$^2$, even more particularly equal to or less than about $10^{-13}$ m$^2$;

a permeability value substantially across a thickness of barrier layer 10 or in a direction between the first and second adsorbent layers (for example, in a direction substantially along the Z axis illustrated in FIG. 1) within a desired permeability range threshold, for example, about $10^{-6}$ m$^2$ to $10^{-17}$ m$^2$, particularly about $10^{-8}$ m$^2$ to $10^{-15}$ m$^2$, more particularly about $10^{-12}$ m$^2$ to $10^{-15}$ m$^2$, or yet more particularly about $10^{-13}$ m$^2$ to $10^{-15}$ m$^2$;

a material composition of at least one of metals (such as aluminum and aluminum alloys), membranes, polymers, or carbon materials (such as carbon molecular sieve, graphite oxide, graphene, graphene flakes, exfoliated graphene and exfoliated graphene flakes);

a low thermal capacity, and a material thickness (for example, in a direction substantially along the Z axis illustrated in FIG. 1) of equal to or less than about 1000 μm, or more particularly equal to or less than about 100 μm, or yet more particularly equal to or less than about 10 μm, or even more particularly equal to or less than about 5 μm.

In an optional embodiment, an adsorbent structure comprises a first adsorbent layer juxtaposed to (placed next to and in contact with), in thermal communication, and in direct contact with a second adsorbent layer, the first adsorbent layer further comprises at least a first adsorbent material and the second adsorbent layer further comprises at least a second adsorbent material, where at least one adsorbent material composition, physical characteristic or property, for example, hydrophobicity, permeability, or pore size, of the first adsorbent material differs from those of the second adsorbent material. In such an embodiment, the adsorbent structure optionally comprises a suitable binding material, thermally conductive materials and/or an adsorbent support optionally having a thermally conductive material. In an exemplary embodiment, an adsorbent structure comprises: a first adsorbent layer having at least a first adsorbent material, for example, an activated carbon adsorbent material, polyethyleneimine doped silica adsorbent material, a hydrophobic zeolite adsorbent material, or a hydrophobic adsorbent material, juxtaposed to a second adsorbent layer having at least a second adsorbent material, for example, a (hydrophilic) zeolite adsorbent material, a hydrophilic adsorbent material or metal organic framework (MOF) adsorbent material. An adsorbent structure comprising a first adsorbent layer juxtaposed to a second adsorbent layer may advantageously increase the heat transfer and thermal conductivity between the first adsorbent layer and second adsorbent layer, and respective adsorbent materials.

In an optional embodiment, an adsorbent structure comprises a barrier layer juxtaposed to, in thermal communication and in direct contact with a second adsorbent layer where the second adsorbent layer further comprise at least one adsorbent material, for example, a second adsorbent material such as a (hydrophilic) zeolite adsorbent material, a hydrophilic adsorbent material or metal organic framework (MOF) adsorbent material. Optionally, the second adsorbent layer comprises one or more of a suitable binding material, a thermally conductive material and/or an adsorbent support (optionally having a thermally conductive material). The barrier layer may function as a diffusion retarder or barrier which may be, for example, semi-impermeable or substantially impermeable to one or more gasses or fluids such as, for example, water in the form of steam. In one such embodiment, the barrier layer may comprise a material which is semi-impermeable to one or more gas (and/or water in the form of steam) so as to provide for a desirably controlled rate of transfer of one or more such gas through a thickness of barrier layer, for example, in a direction substantially along the Z axis illustrated in FIG. 1.

In an optional embodiment, an adsorbent structure comprises a barrier layer interposed between, in thermal communication and in direct contact with a first adsorbent layer and a second adsorbent layer where the first adsorbent layer comprises at least one adsorbent material and the second adsorbent layer comprises at least one adsorbent material where the adsorbent materials are substantially similar in adsorbent material composition, physical characteristic, and/or property. In such an embodiment, the first and second adsorbent layers of the adsorbent structure optionally comprises a suitable binding material, thermally conductive materials and/or an adsorbent support optionally having a thermally conductive material. For example, an adsorbent structure comprises a barrier layer interposed between a first adsorbent layer and a second adsorbent layer where the composition of the adsorbent material of the first and second adsorbent layers are substantially similar and may comprise any suitable adsorbent material, including for example, an activated carbon adsorbent material, an polyethyleneimine doped silica adsorbent material, a hydrophobic or hydrophilic zeolite adsorbent material, a hydrophobic adsorbent material, a metal organic framework (MOF) adsorbent material, an amine material, and combinations thereof.

In one embodiment, a parallel passage contactor may be configured to comprise; a plurality of adsorbent layers defining at least one fluid passage; five or more facets (or particularly six or more facets) where the facets of the parallel passage contactor may be at least partially substantially defined by one or more adsorbent layers or one or more adsorbent structures; at least a first set of opposing facets having a first distance between opposing facets (for example, a first facet and a second facet) and a second set of opposing facets having a second distance between opposing facets (for example, a third facet and a fourth facet), where the first distance is equal to or greater than about the second distance (or the second distance is equal to or less than about the first distance); and the facets of the first and second sets of opposing facets (for example, first, second, third and fourth facets) have at least one port fluidly connected to at least one fluid passage for admitting and/or recovering a fluid stream. A perimeter of at least one of the parallel passage contactor, an adsorbent layer, and/or adsorbent structure, may at least partially define a facet of a parallel passage contactor. Optionally, the first set of opposing facets and the second set of opposing facets may share a common facet. For example, a parallel passage contactor configured with five facets may comprise one or more fluid passages interposed between a plurality of triangular shaped adsorbent layers and/or adsorbent structures, while a parallel passage contactor configured with six facets may comprise one or more fluid passages interposed between a plurality or rectangular or square shaped adsorbent layers and/or adsorbent structures.

Figure 2:
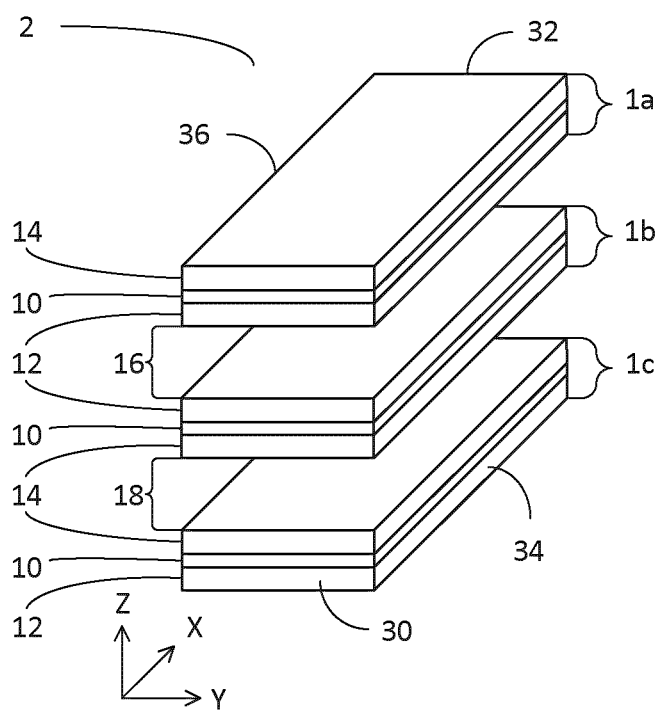
FIG. 2 is a perspective view illustrating a parallel passage contactor employing a plurality of adsorbent structures such as those illustrated in FIG. 1, according to an embodiment of the invention.

FIG. 2 illustrates an exemplary parallel passage contactor 2, comprising a plurality of adsorbent structures 1a, 1b, and 1c, where the outside perimeter of adsorbent structures 1a, 1b, and 1c, and/or the outside perimeter of adsorbent layers 12 and 14, may partially define a first facet 30, a second facet 32, a third facet 34, and a fourth facet 36, according to an embodiment of the invention. In one such embodiment, for example, a first adsorbent structure 1a, a second adsorbent structure 1b, and a third adsorbent structure 1c, may desirably be configured in an exemplary parallel passage contactor structure 2 so as to bound or define at least a portion of a first fluid passage 16 and at least a portion of a second fluid passage 18. In one aspect, a plurality of adsorbent structures may be configured such that first passage 16 bounded or defined by at least one first adsorbent layer, for example, first adsorbent layer 12, and second fluid passage 18 bounded or defined by at least one second adsorbent layer, for example, second adsorbent layer 14, may desirably alternate within a multi-passage parallel passage contactor. In one embodiment, first fluid passage 16 and second fluid passage 18 may desirably be substantially fluidly separate within the parallel passage contactor. In one aspect, exemplary adsorbent structures 1a, 1b, 1c, may desirably be substantially similar to adsorbent structure 1 illustrated in FIG. 1 and described above, however, adsorbent structure 1b may be configured within parallel passage contactor 2 such that a first adsorbent layer 12 of adsorbent structure 1b is adjacent or in apposition to a first adsorbent layer 12 of adsorbent structure 1a, so as to thereby define or bound at least a portion of first fluid passage 16. Similarly, in one aspect, a second adsorbent layer 14 of adsorbent structure 1b may desirably be adjacent or in apposition to a second adsorbent layer 14 of adsorbent structure 1c, so as to thereby define or bound at least a portion of second fluid passage 18. In one such embodiment, at least a portion of one or more walls of first fluid passage 16 may be bounded and/or defined (or formed) by one or more first adsorbent layers 12 having at least one adsorbent material, for example, a first adsorbent material. At least a portion of one or more walls of second fluid passage 18 may be bounded and/or defined (or formed) by one or more second adsorbent layers 14 having at least one adsorbent material, for example, a second adsorbent material.

In one embodiment, parallel passage contactor 2 and adsorbent structures 1a, 1b, and 1c, are configured comprising a longitudinal distance or a first distance substantially parallel to a longitudinal axis (for example, a distance substantially parallel to the X axis as illustrated in FIG. 2 from first facet 30 of an adsorbent layer and/or parallel passage contactor 2, to an opposing or second facet 32 of the adsorbent layer and/or parallel passage contactor 2) and a lateral distance or second distance substantially parallel to a lateral axis (for example, a distance substantially parallel to the Y axis as illustrated in FIG. 2 from third facet 34 of the adsorbent layer and/or parallel passage contactor 2, to an opposing or fourth facet 36 of the adsorbent layer and/or parallel passage contactor 2) where about the longitudinal or first distance may be equal to or greater than about the lateral or second distance, or the lateral or second distance may be equal to or less than about the longitudinal or first distance. Exemplary adsorbent structures 1a, 1b, and 1c comprise a barrier layer 10, but need not.

In one aspect, one or more seals or sealing structures (all not shown in FIG. 2) may be employed to seal, and to bound and/or define at least a portion of first fluid passage 16 and/or at least a portion of second fluid passage 18. Spacers (such as suitable known spacing features or devices) (all not shown in FIG. 2) may optionally be employed to assist in separating adsorbent structures 1a, 1b and 1c, and defining first fluid passage 16 and/or second fluid passage 18. In an optional aspect, additional adsorbent structures (all not shown in FIG. 2) may be employed to increase the quantity of first fluid passages and second fluid passages of a parallel passage contactor, where the fluid passages may be configured to alternate between a first fluid passage 16 (bounded at least in part by first adsorbent layers 12) and a second fluid passage 18 (bounded at least in part by second adsorbent layers 14) within a parallel passage contactor, for example, a parallel passage contactor may comprise a plurality of adsorbent structures, a plurality of first fluid passages, and a plurality of second fluid passages, where the plurality of adsorbent structures forms and/or defines the plurality of first fluid passages, and the plurality of second fluid passages (all not shown in FIG. 2). In one embodiment, a first fluid passage 16 may be interposed between a plurality of second fluid passages 18, or a second fluid passage 18 may be interposed between a plurality of first fluid passages 16. Optionally, adsorbent structures at one or both ends or facets (for example, one or more facets of the Z axis illustrated in FIG. 2) of a parallel passage contactor need not comprise a first adsorbent layer 12 and a second adsorbent layer 14, (for example, adsorbent structure 1a need not comprise second adsorbent layer 14 and/or adsorbent structure 1c need not comprise a first adsorbent layer 12). In one such optional embodiment, adsorbent structure 1a may comprise a first adsorbent layer 12 and barrier layer 10, and/or adsorbent structure 1c may comprise a second adsorbent layer 14 and barrier layer 10 (all not shown in FIG. 2). Also optionally, one or more baffles or suitable known spacing features or devices may be employed within first fluid passage 16 and/or second fluid passage 18 to direct the flow of a fluid stream admitted to flow within first fluid passage 16 and/or second fluid passage 18.

In one embodiment, a parallel passage contactor 2 may comprise a first port (not shown in FIG. 2) configured substantially on a facet, for example, a first facet 30, of parallel passage contactor 2 and fluidly connected to one or more first fluid passage 16 and one or more second fluid passage 18 for admitting or recovering, for example, a multi-component fluid stream as a feed gas stream, or a first product stream, into the one or more first fluid passage 16 and the one or more second fluid passage 18 of the parallel passage contactor 2; a second port (not shown in FIG. 2) configured substantially on a facet, for example, a second facet 32, of parallel passage contactor 2 and fluidly connected to the one or more first fluid passage 16 and the one or more second fluid passage 18 of the parallel passage contactor 2 for recovering or admitting, for example, a first product stream, a multi-component fluid stream as a feed gas stream, from one or more first fluid passage 16 and one or more second fluid passage 18 of parallel passage contactor 2; a third port (not shown in FIG. 2) configured substantially on a facet, for example, a third facet 34, of parallel passage contactor 2 and fluidly connected to the one or more first fluid passage 16 and optionally the one or more second fluid passages 18, for admitting or recovering, for example, a desorption or regeneration fluid stream, optionally a purge fluid stream, optionally a cooling fluid stream, and/or a second product stream, into the one or more first fluid passage 16 and optionally the one or more second fluid passages 18 of parallel passage contactor 2; and a fourth port (not shown in FIG. 2) configured substantially on a facet, for example, a fourth facet 36, of parallel passage contactor 2 and fluidly connected to the one or more first fluid passage 16 and optionally the one or more second fluid passages 18 for recovering or admitting, for example, a second product stream or a desorption or regeneration fluid stream, optionally a purge fluid stream, optionally and/or a cooling fluid stream, from the one or more first fluid passage 16 and optionally the one or more second fluid passages 18 of parallel passage contactor 2. A first opposing facet set may comprise first facet 30 and second facet 32 having a first distance substantially between first facet 30 and second facet 32, and a second opposing facet set may comprise third facet 34 and fourth facet 36 having a second distance substantially between third facet 34 and fourth facet 36. In an alternative embodiment, parallel passage contactor 2 may comprise a fifth port (not shown in FIG. 2) configured substantially on a facet, for example, a third facet 34, of parallel passage contactor 2 and fluidly connected to the one or more second fluid passages 18, for admitting or recovering, for example, desorption or regeneration fluid stream, a purge stream, and/or a cooling stream. In another alternative embodiment, parallel passage contactor 2 may comprise a sixth port (not shown in FIG. 2) configured substantially on a facet, for example, a fourth facet 36, of parallel passage contactor 2 and fluidly connected to the one or more second fluid passages 18, for admitting or recovering, for example, desorption or regeneration fluid stream, a purge stream, and/or a cooling stream. Optionally, parallel passage contactor 2 may comprise a sixth port (not shown in FIG. 2) configured substantially on a facet, for example, a fourth facet 36, and fluidly connected to the one or more second fluid passages 18, for admitting or recovering, for example, desorption or regeneration fluid stream, a purge stream, and/or a cooling stream.

In an alternative embodiment, parallel passage contactor 2 may comprise a first port, at least one of a third port or a fourth port, and optionally a fifth port or a sixth port (all not shown in FIG. 2) configured substantially on a common facet, for example, a first facet 30, of parallel passage contactor 2; a second port, at least one of the third port or the fourth port, and optionally a fifth port or a sixth port (all not shown in FIG. 2) configured substantially on a common facet, for example, second facet 32, of parallel passage contactor 2; and optionally, one or more baffles may be employed within first fluid passage 16 and/or second fluid passage 18 to separate a plurality of ports configured substantially on a common facet and/or to direct the flow of a fluid stream admitted to flow within first fluid passage 16 and/or second fluid passage 18, where the one or more baffles may substantially intersect the common facet and extent into first fluid passage 16 and/or second fluid passage 18 (all ports and baffles not shown in FIG. 2). In one aspect, at least one of first port, second port, third port fourth, optional fifth port and optional sixth port (all not shown in FIG. 2) may be substantially sealed by a suitable seal, such as for example a gate valve, a gated valve rotatable around an axis or hinge, or a plurality of concentric seals around a common axis.

In one embodiment, a parallel passage contactor may comprise a longitudinal or first distance between a first port and a second port, and a lateral or second distance between a third port and a fourth port, where the first distance is equal to or greater than the second distance, or the second distance is equal to or less than the first distance, and optionally the first port and/or the second port are configured substantially perpendicular (strictly or nearly perpendicular) to the third port and/or the fourth port.

In alternative embodiments, a parallel passage contactor may comprise a plurality of adsorbent structures further comprising a barrier layer interposed between, in thermal communication and in direct contact with a first adsorbent layer and a second adsorbent layer where the first adsorbent layer comprises at least one adsorbent material and the second adsorbent layer comprises at least one adsorbent material where the adsorbent materials are substantially similar in adsorbent material composition, physical characteristic, and/or property.

In alternative embodiments, a parallel passage contactor may comprise a plurality of adsorbent structures further comprising a first adsorbent layer juxtapose to, in thermal communication, and in direct contact with a second adsorbent layer, the first adsorbent layer having one or more adsorbent material, for example, a first adsorbent material, and the second adsorbent layer having one or more adsorbent material, for example, a second adsorbent material where the first adsorbent material and the second adsorbent material differ in at least one of adsorbent material composition, physical characteristic, and/or properties. The parallel passage contactor may also comprise one or more first fluid passages interposed between a plurality of first adsorbent layers (for example, the plurality of first adsorbent layers may define at least a portion of a first fluid passage) and one or more second fluid passages interposed between a plurality of second adsorbent layers (for example, the plurality of second adsorbent layers may define at least a portion of a second fluid passage).

In alternative embodiments, a parallel passage contactor may comprise a plurality of adsorbent structures further comprising a barrier layer juxtaposed to, in thermal communication, and in direct contact with a second adsorbent layer, where the second adsorbent layer comprise at least an adsorbent material (for example, a second adsorbent material). The parallel passage contactor also comprises at least one first fluid passage interposed between a plurality of barrier layers (for example, the barrier layer may at least partially define the first fluid passage), and at least one second fluid passage interposed between a plurality of second adsorbent layers. Optionally the second adsorbent layer comprises a suitable binding material, thermally conductive materials and/or an adsorbent support optionally having a thermally conductive material. The barrier layer may function as a diffusion retarder or barrier which may be, for example, semi-impermeable or substantially impermeable to one or more gasses or fluids such as, for example, water in the form of steam. In one such embodiment, the barrier layer may comprise a material which is semi-impermeable to one or more gas (and/or water in the form of steam) so as to provide for a desirably controlled rate of transfer of one or more such gas through a thickness of barrier layer, for example, in a direction substantially along the Z axis illustrated in FIG. 2.

The embodiment adsorbent structure and parallel passage contactor as described above may offer advantageous including, for example, enabling an embodiment adsorptive gas separation processes described herein; allowing for the regeneration or desorption of one or more components adsorbed on one or more adsorbent materials of both adsorbent layers by admitting a regeneration or desorption fluid stream into a first fluid passage of a parallel passage contactor while substantially eliminating or reducing admission of a regeneration or desorption fluid stream into a second fluid passage of the parallel passage contactor; reducing contact or exposure of the regeneration or desorption fluid stream to an adsorbent material of an adsorbent layer, for example, second adsorbent layer, of a parallel passage contactor; and utilization of heat from a desorption fluid stream which may be transferred to a second adsorbent layer via a first adsorbent layer and optionally from a barrier layer; passively controlling the admittance of a desorption or regeneration fluid to a second adsorbent layer via a first adsorbent layer and optionally from a barrier layer. This may advantageously result in, for example, reducing the loss of adsorptive capacity of the one or more adsorbent material of the second adsorbent layer, due to adsorption of one or more components or species of the regeneration or desorption fluid, contamination of the adsorbent material, and/or loss of adsorbent materials of second adsorbent layer due to erosion or washing; enable the employment of hydrophilic adsorbent materials in the second adsorbent layer while employing a steam stream as a desorption or regeneration fluid stream; and reducing the amount of regeneration or desorption fluid admitted into a parallel passage contactor, for example, reduce the steam ratio of an adsorptive gas separation process, which may further result in reducing the energy consumption, capital cost, and/or operating cost of the adsorptive gas separation process and adsorptive gas separator. Other advantages of the embodiment adsorbent structure and parallel passage contactor as described herein includes enable various fluid streams, for example, feed stream, regeneration or desorption fluid stream, and cooling fluid stream, to be admitted and recovered from more than two facets of a parallel passage contactor allowing for, for example, a desorption or regeneration fluid stream to travel a shorter distance through a parallel passage contactor while maintaining a desirable longer travel distance of a feed stream through the parallel passage contactor, which may advantageously result in a shorter residence time for a fluid stream, for example, a desorption or regeneration fluid stream, reduced adsorption of undesirable components on the adsorbent material, reduced loss of available adsorbent capacity and reduced pressure drop across the parallel passage contactor.

In one embodiment, parallel passage contactor 2, adsorbent structures 1*a*, 1*b* and 1*c* may be configured according to any suitable shape, size and orientation, may be stationary or alternatively may be movable, for example, rotating, within an adsorptive gas separator, and may advantageously be employed in any suitable configuration for use in an exemplary adsorptive gas separation process, such as described herein in accordance with one aspect of the invention.

In a process embodiment of the present invention, an adsorptive gas separation process is provided for separating at least a first component, for example, carbon dioxide, sulfur oxides, nitrogen oxides, or oxygen, from a multi-component fluid mixture or stream (for example, a flue gas stream, a post-combustion gas stream produced by a fuel combustor, or a natural gas stream) in an adsorptive gas separator comprising at least one embodiment parallel passage contactor (as illustrated in FIG. 2 and described above) further comprising a plurality of adsorbent structures (as illustrated in FIG. 1 and described above), one or more first fluid passage, and one or more second fluid passage. The adsorbent structure may comprise a first adsorbent layer having at least one adsorbent material (for example, a first adsorbent material), a second adsorbent layer having at least one adsorbent material (for example, a second adsorbent material), and optionally, a barrier layer interposed between and in thermal communication through direct contact with the first adsorbent layer and the second adsorbent layer. In one aspect, the first adsorbent material and the second adsorbent material may differ in at least one of adsorbent material composition, physical characteristics and/or properties, for example, adsorbent chemical composition, hydrophobicity, adsorptive capacity or porosity. In another aspect, a barrier layer may comprise a thermally conductive material, and in a particular such aspect may desirably have a thermal conductivity of equal to or greater than a desired thermal conductivity threshold of, for example, about 10 W/m·K, or particularly about 100 W/m·K or more particularly about 200 W/m·K. In another aspect, a barrier layer may comprise a permeability value substantially across the thickness of the barrier layer or in a direction between the first and second adsorbent layers (for example, in a direction substantially along the Z axis illustrated in FIGS. 1 and 2) of equal to or less than a desired permeability threshold, for example, equal to or less than about a permeability value of at least one of a first adsorbent layer and/or a second adsorbent layer, or equal to or less than about $10^{-6}$ m$^2$, particularly equal to or less than about $10^{-8}$ m$^2$, more particularly equal to or less than about $10^{-12}$ m$^2$, even more particularly equal to or less than about $10^{-13}$ m$^2$. In another such aspect, a barrier layer may comprise a permeability value substantially across the thickness of the barrier layer or in a direction between the first and second adsorbent layers within a desired permeability range threshold, for example, about $10^{-6}$ m$^2$ to $10^{-17}$ m$^2$, particularly about $10^{-8}$ m$^2$ to $10^{-15}$ m$^2$, more particularly about $10^{-12}$ m$^2$ to $10^{-15}$ m$^2$, or yet more particularly about $10^{-13}$ m$^2$ to $10^{-15}$ m$^2$. An adsorbent structure may be interposed between a first fluid passage and a second fluid passage and a plurality of adsorbent structures may be configured where the first fluid passage and second fluid passage alternate within the parallel passage contactor, but need not be. At least a portion of the first fluid passage may be formed or defined by a first adsorbent layer having at least one adsorbent material, for example, first adsorbent material. At least a portion of the second fluid passage may be formed or defined by a second adsorbent layer having at least one adsorbent material, for example, second adsorbent material.

In one process embodiment, an adsorptive gas separation process for separating at least a first component from a multi-component fluid stream comprises the following steps:

(a) admitting the multi-component fluid stream as a feed stream into one or more second fluid passages of the parallel passage contactor and optionally one or more first fluid passages of a parallel passage contactor, comprising:

a plurality of adsorbent structures having an optional barrier layer interposed between a first adsorbent layer and a second adsorbent layer, the first adsorbent layer having one or more adsorbent material, for example, a first adsorbent material, and the second adsorbent layer having one or more adsorbent material, for example, a second adsorbent material, where optionally the first adsorbent material and the second adsorbent material differ in at least one of adsorbent material composition, physical characteristics, and/or properties, but need not be; one or more first fluid passage where at least a portion of the one or more first fluid passage are defined by one or more first adsorbent layer; and one or more second fluid passage where at least a portion of the one or more second fluid passage are defined by one or more second adsorbent layer;

contacting the feed stream with an adsorbent material, for example, a second adsorbent material, of the second adsorbent layer at least partially bounding or defining the second fluid passage and optionally an adsorbent material, for example, a first adsorbent material, of the first adsorbent layer at least partially bounding or defining the first fluid passage;

(b) adsorbing at least a portion of the first component on the adsorbent material, for example, second adsorbent material, of the second adsorbent layer at least partially bounding or defining the second fluid passage and optionally on the adsorbent material, for example, first adsorbent material, of the first adsorbent layer at least partially bounding or defining the first fluid passage;

(c) recovering a first product stream at least periodically ("periodically" indicates non-continuously, but not necessarily at regular intervals; "at least periodically" indicates that continuity is possible but not necessary) depleted in the first component relative to the multi-component fluid stream or feed stream from one or more second fluid passages of the parallel passage contactor and optionally one or more first fluid passages of the parallel passage contactor;

(d) admitting a desorption or regeneration fluid stream, for example, a water stream, a steam stream, an air stream, an inert gas stream, a fluid stream comprising substantially the first component, and a combustion flue gas stream, into one or more first fluid passage of the parallel passage contactor where optionally the desorption or regeneration fluid stream may be at a temperature equal to or greater than about 60° C., preferably equal to or greater than about 80° C., or more preferably equal to or greater than about 100° C.;

(e) optionally regenerating the at least one adsorbent material of the first adsorbent layer (for example, desorbing at least a portion of the first component adsorbed on the at least one adsorbent material, for example, first adsorbent material, of the first adsorbent layer by at least one of: a temperature swing such as heating the at least one adsorbent material of the first adsorbent layer, a partial pressure swing, a pressure swing, a sweep, and/or a displacement purge);

(f) regenerating the at least one adsorbent material of the second adsorbent layer (for example, desorbing at least a portion of the first component adsorbed on the at least one adsorbent material, for example, second adsorbent material, of the second adsorbent layer by heating the at least one adsorbent material, of the second adsorbent layer) where heat may be provided by at least one of:

transferring heat from the desorption or regeneration fluid stream through the optional barrier layer optionally via the first adsorbent layer, to the at least one adsorbent material, for example, second adsorbent material, of the second adsorbent layer; and diffusing at least a portion of the desorption or regeneration fluid stream through the optional barrier layer optionally via the first adsorbent layer, contacting at least a portion of the desorption or regeneration fluid stream with the at least one adsorbent material (for example, second adsorbent material) of the second adsorbent layer, and liberating a heat of adsorption through adsorption of at least a portion of the desorption or regeneration fluid stream on the at least one adsorbent material (for example, second adsorbent material) of the second adsorbent layer; and (g) recovering a second product stream at least periodically enriched in the first component relative to the multi-component fluid stream from at least one of the one or more first and second fluid passages of the parallel passage contactor.

In an optional embodiment, during step (a), the process may further comprise admitting the multi-component fluid stream as a feed stream into an adsorptive gas separator comprising at least one parallel passage contactor. Optionally, prior to step (d), the process may further comprise terminating the admittance of the multi-component fluid stream or feed stream into the parallel passage contactor, one or more second fluid passages of the parallel passage contactor and optionally one or more first fluid passages of the parallel passage contactor, according to one embodiment. In an optional embodiment, during steps (d) and/or (e), the process may further comprise generating or liberating a heat of adsorption through adsorption of at least a portion of the desorption or regeneration fluid stream on the at least one adsorbent material (for example, first adsorbent material) of the first adsorbent layer. In another optional embodiment, during step (f) the process may further comprise admitting a desorption or regeneration fluid stream, for example, a water stream, a steam stream, an air stream, an inert gas stream, a fluid stream comprising substantially the first component, and a combustion flue gas stream, into one or more second fluid passages of the parallel passage contactor where optionally the desorption or regeneration fluid stream may be at a temperature equal to or greater than about 60° C., preferably equal to or greater than about 80° C., or more preferably equal to or greater than about 100° C. Also in a further optional embodiment, after steps (e) and/or (f) the process may further comprise terminating the admittance of desorption or regeneration fluid stream into the one or more first fluid passage of the parallel passage contactor. Optionally, during steps (e), (f), and/or (g), the process may additionally comprise fluidly connecting a vacuum or vacuum source to the first and/or second fluid passages of the parallel passage contactor and optionally an adsorptive gas separator, inducing a vacuum in the first and/or second fluid passages of the parallel passage contactor and recovering a second product stream at least periodically enriched in the first component relative to the multi-component fluid stream from the second fluid passage of the parallel passage contactor. In another optional embodiment, during steps (f) and/or (g) the process may further comprise admitting a fluid stream, for example, a purge or sweep gas stream, into the second fluid passage of the parallel passage contactor.

In one embodiment, alternatively during step (a), the process may comprise admitting the multi-component fluid stream as a feed stream into one or more second fluid passages of the parallel passage contactor and optionally one or more first fluid passages of a parallel passage contactor, comprising:

a plurality of adsorbent structures having a first adsorbent layer juxtapose to a second adsorbent layer, the first adsorbent layer having one or more adsorbent material, for example, a first adsorbent material, and the second adsorbent layer having one or more adsorbent material, for example, a second adsorbent material, where optionally the first adsorbent material and the second adsorbent material differ in at least one of adsorbent material composition, physical characteristic, and/or properties; one or more first fluid passage where at least a portion of the one or more first passage are at least partially bound or defined by one or more first adsorbent layer; and one or more second fluid passage where at least a portion of the one or more second passage are at least partially bound or defined by one or more second adsorbent layer;

contacting the feed stream with an adsorbent material, for example, a second adsorbent material, of the second adsorbent layer at least partially bounding or defining at least a portion of the second fluid passage and optionally an adsorbent material, for example, a first adsorbent material, at least partially bounding or defining the first adsorbent layer.

In an alternative embodiment, during step (a), the process may comprise admitting the multi-component fluid stream as a feed stream into one or more second fluid passages of the parallel passage contactor comprising:

a plurality of adsorbent structures having a barrier layer juxtaposed to, in thermal communication and in direct contact with a second adsorbent layer where the second adsorbent layer comprises at least one adsorbent material, for example, a second adsorbent material; one or more first fluid passage at least partially bound or defined by one or more barrier layer (for example, a first fluid passage may be interposed between a plurality of barrier layers); and one or more second fluid passage at least partially bound or defined by one or more second adsorbent layer (for example, a second fluid passage may be interposed between a plurality of second adsorbent layers);

contacting the feed stream with the at least one adsorbent material, for example, a second adsorbent material, of the second adsorbent layer at least partially bounding or defining at least a portion of the second fluid passage.

The embodiment adsorptive gas separation processes as described herein may offer advantageous including, for example, allowing for the regeneration of the one or more adsorbent materials such as desorption of one or more components adsorbed on one or more adsorbent materials of both adsorbent layers by admitting a regeneration or desorption fluid stream into a first fluid passage of a parallel passage contactor while substantially eliminating or reducing admission of a regeneration or desorption fluid stream into a second fluid passage of the parallel passage contactor; reducing contact or exposure of the regeneration or desorption fluid stream to an adsorbent material of an adsorbent layer, for example, second adsorbent layer, of a parallel passage contactor; and utilization of heat from a desorption fluid stream which may be transferred to a second adsorbent layer via a first adsorbent layer and optionally from a barrier layer; passively controlling the admittance of a desorption or regeneration fluid to a second adsorbent layer via a first adsorbent layer and optionally from a barrier layer. This may advantageously result in, for example, reducing the loss of adsorptive capacity of the one or more adsorbent material of the second adsorbent layer, due to adsorption of one or more components or species of the regeneration or desorption fluid, contamination of the adsorbent material, and/or loss of adsorbent materials of second adsorbent layer due to erosion or washing; enable the employment of hydrophilic adsorbent materials in the second adsorbent layer while employing a steam stream as a desorption or regeneration fluid stream; and reducing the amount of regeneration or desorption fluid admitted into a parallel passage contactor, for example, reduce the steam ratio of an adsorptive gas separation process, which may further result in reducing the energy consumption, capital cost, and/or operating cost of the adsorptive gas separation process and adsorptive gas separator. Other advantages of the embodiment adsorbent structure and parallel passage contactor as described above includes enable various fluid streams, for example, feed stream, regeneration or desorption fluid stream, and cooling fluid stream, to be admitted and recovered from more than two facets of a parallel passage contactor allowing for, for example, a desorption or regeneration fluid stream to travel a shorter distance through a parallel passage contactor while maintaining a desirable longer travel distance of a feed stream through the parallel passage contactor, which may advantageously result in a shorter residence time for a fluid stream, for example, a desorption or regeneration fluid stream, reduced adsorption of undesirable components on the adsorbent material, reduced loss of available adsorbent capacity and reduced pressure drop across the parallel passage contactor.

In another aspect, after desorption of at least a portion of the first fluid component adsorbed on an adsorbent material (for example, first adsorbent material) of the first adsorbent layer 12 and/or an adsorbent material (for example, second adsorbent material) of the second adsorbent layer 14, for example, after step (g above, the adsorptive gas separation process may comprise an optional cooling step comprising admitting a conditioning stream or cooling stream, for example, an air stream or an inert gas stream at a temperature suitable to cool at least a portion of the adsorbent materials of the first adsorbent layer 12 and/or second adsorbent layer 14, to a desired post-regeneration temperature or pre-adsorption temperature, such as a temperature of equal to or less than about 60° C. or particularly equal to or less than about 50° C., or more particularly equal to or less than about 40° C. In one such embodiment, a suitable cooling fluid may be admitted into the first fluid passages 16 of the parallel passage contactor and optionally the second fluid passages 18 of the parallel passage contactor, and optionally an adsorptive gas separator. In a particular such embodiment, admission of the cooling fluid may provide for decreasing the temperature of the adsorbent material of the first adsorbent layer 12 and optionally decreasing the temperature of the adsorbent material of the second adsorbent layer 14. Subsequent to such optional cooling, in one embodiment, the process may further comprise recovering for example, a third product stream, from the first fluid passage 16 and/or the second fluid passage 18, optionally from the parallel passage contactor 2 and optionally from an adsorptive gas separator. Subsequent to such recovery, in a further optional aspect, the process may further comprise terminating the admittance of the conditioning stream or cooling stream into one or more of: the optional adsorptive gas separator, parallel passage contactor 2, and first fluid passage 16 and/or second fluid passage 18. In a particular such embodiment, after completion of the above-described cooling step the steps of the adsorptive gas separation process may be repeated sequentially, substantially continuously or semi-continuously, such as in a substantially cyclic process or adsorptive device.

In one embodiment, an adsorptive gas separation process employing an adsorptive gas separator comprising an exemplary parallel passage contactor 2 may advantageously reduce the consumption of a desorption or regeneration fluid stream (for example, a steam or other suitable desorption gas stream), and/or energy, in order to regenerate an adsorbent material (for example, first adsorbent material) of a first adsorbent layer 12 and/or an adsorbent material (for example, second adsorbent material) of a second adsorbent layer 14 of an adsorbent structure and parallel passage contactor 2. In a particular such embodiment, a desorption or regeneration fluid stream 24 (for example, a steam or other suitable desorption gas stream) is admitted into a first fluid passage 16 of the parallel passage contactor 2 and employed to increase the temperature of an adsorbent material (for example, first adsorbent material) in the first adsorbent layer 12 and transfer heat to an adsorbent material (for example, second adsorbent material) in the second adsorbent layer 14, via barrier layer 10, providing desorption heat for desorbing at least a portion of one or more components adsorbed on the adsorbent material (for example, second adsorbent material) in the second adsorbent layer 14. In such an embodiment, low or limited permeability along with the thermal conductivity of barrier layer 10 of the adsorbent structure may advantageously enable an adsorbent structure to employ a hydrophilic adsorbent material or an adsorbent material with a lesser threshold of hydrophobicity, for example, a zeolite adsorbent material, as at least a portion of the total adsorbent materials employed for an adsorbent structure, which may result in reduced material cost and/or increased adsorptive capacity, relative to other hydrophobic adsorbent materials.

In a further optional embodiment according to the invention, a desorption or regeneration fluid stream 24 (for example, a steam stream or other suitable desorption gas stream) may be admitted into the first fluid passage 16 of the parallel passage contactor 2 and employed to increase the temperature of a hydrophobic first adsorbent material in the first adsorbent layer 12 and provide desorption heat to desorb at least a portion of one or more components adsorbed on the hydrophobic first adsorbent material of the first adsorbent layer 12. Additionally, in such an embodiment, a selectively permeable barrier layer 10 may comprise a selectively permeable barrier layer material, such as graphene sheets or compressed exfoliated graphene flakes, for example, which may desirably allow for a selective diffusion of a portion of the regeneration fluid stream 24 (such as steam) across the selectively permeable barrier layer 10 to a hydrophilic second adsorbent material in the second adsorbent layer 14, so as to allow for adsorption of the diffused portion, components or species of the regeneration fluid stream 24 onto the hydrophilic second adsorbent material, and the liberation of a heat of adsorption of the diffused portion, components, or species of the regeneration fluid stream 24, which may desirably provide desorption heat to desorb at least a portion of one or more components adsorbed on the hydrophilic second adsorbent material of the second adsorbent layer 14. In one aspect, the selectively permeable barrier layer 10 may also desirably be thermally conductive or have a high thermal conductivity such that heat may also be transferred from the first adsorbent layer 12 to the second adsorbent layer 14 through the selectively permeable barrier layer 10 during desorption of one or more components adsorbed on the adsorbent material, for example, hydrophobic first adsorbent material, of the first adsorbent layer 12, in order to provide an additional source of desorption heat to desorb at least a portion of one or more components adsorbed on the adsorbent material of the second adsorbent layer 14. In one such embodiment then, a parallel passage contactor 2 comprising a hydrophobic first adsorbent material in the first adsorbent layer 12 and hydrophilic second adsorbent material in second adsorbent layer 14 and a selectively permeable barrier layer 10 may desirably provide for desorption of one or more components adsorbed on the hydrophilic second adsorbent material of the second adsorbent layer 14 without requiring admitting of a desorption or regeneration stream into one or more second fluid passages 18, and wherein the desorption of one or more components adsorbed on the hydrophilic second adsorbent material of the second adsorbent layer 14 may be driven by a combination of one or more of: transfer of heat to the adsorbent material, for example, hydrophilic second adsorbent material, of the second adsorbent layer 14 from the desorption thermal front in the first adsorbent layer 12 (for example, during desorption of one or more components adsorbed on the adsorbent material of the first adsorbent layer 12), and liberation of heat of adsorption of a diffused portion, components or species of the desorption fluid stream diffusing through barrier layer 10 and adsorbed on second adsorbent layer 14, for example. In such an embodiment, the selectively permeable barrier layer 10 of the adsorbent structure 2 may advantageously enable an adsorbent structure to employ a hydrophilic adsorbent material or an adsorbent material with a lesser threshold of hydrophobicity, for example, a zeolite adsorbent material, as at least a portion of the total adsorbent materials employed for an adsorbent structure, which may result in reduced material cost and/or increased adsorptive capacity, relative to other hydrophobic adsorbent materials.

Figure 3A:
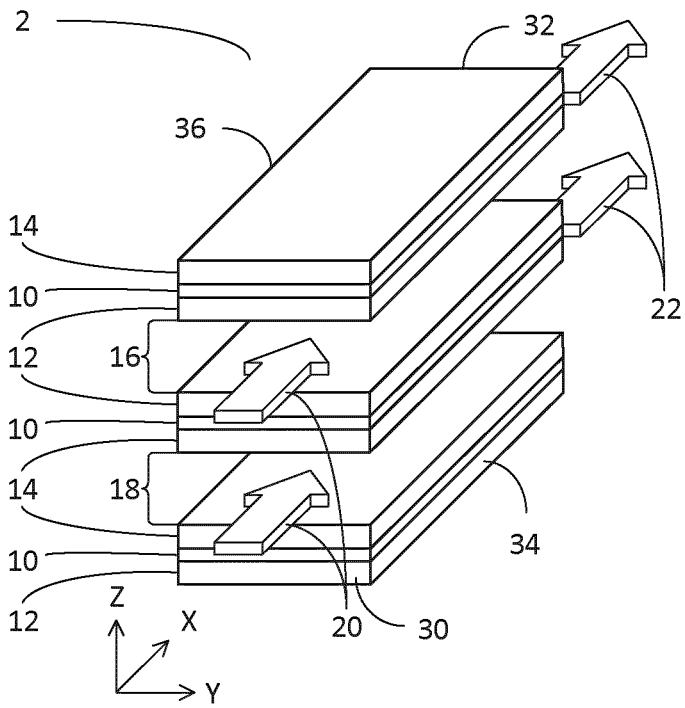
FIG. 3a is a perspective view of an exemplary parallel passage contactor such as illustrated in FIG. 2, illustrating fluid flows during an adsorbing step of an adsorptive gas separation process according to an embodiment of the present invention.

FIG. 3a illustrates parallel passage contactor 2 during an admitting step for admitting a multi-component fluid stream as a feed stream into parallel passage contactor 2 and a recovering step for recovery of a first product stream from the parallel passage contactor 2 of an adsorptive gas separation process according to an embodiment of the present invention. During an admitting step for admitting a multi-component fluid stream as a feed stream, for example, during step (a) of the adsorptive gas separation process described above, a feed stream 20 may be admitted into a first fluid passage 16 and a second fluid passage 18 of parallel passage contactor 2, such as through a first port (not shown in FIGS. 2, and 3a) configured substantially on a facet, for example, a first facet 30, of parallel passage contactor 2, to flow in a substantially longitudinal direction or substantially parallel along a longitudinal axis (substantially parallel to the X axis illustrated in FIGS. 2 and 3a) of first fluid passage 16, second fluid passage 18, and parallel passage contactor 2. During a recovering step for recovery of a first product stream, for example, during step (c) of the adsorptive gas separation process described above, a first product stream 22 may be recovered at least periodically, optionally from first fluid passage 16 and/or second fluid passage 18 of parallel passage contactor 2, such as through a second port (not shown in FIGS. 2, and 3a) configured substantially on a facet, for example, a second facet 32, for example. A first opposing facet set may comprise first facet 30 and second facet 32 having a distance, for example, a first distance, between first facet 30 and second facet 32. In one embodiment, during an admitting step, for example, step (a) of the adsorptive gas separation process described above, a multi-component fluid stream, for example, feed stream 20, may be admitted into parallel passage 2 to travel through first fluid passage 16 and second fluid passage 18 of parallel passage contactor 2, a longitudinal or first distance which may be defined as at least one of: distance which the feed stream is in contact with one or more adsorbent materials of first adsorbent layer 12 and/or one or more adsorbent materials of second adsorbent layer 14 of parallel passage contactor 2; a distance or length substantially between an inlet port (for example, a first port) and an outlet port (for example, a second port) of a parallel passage contactor, a distance or length substantially between an opposing set of facets (for example, first opposing facet set) of a parallel passage contactor; and a distance or length substantially between first facet 30 and second facet 32.

Figure 3B:
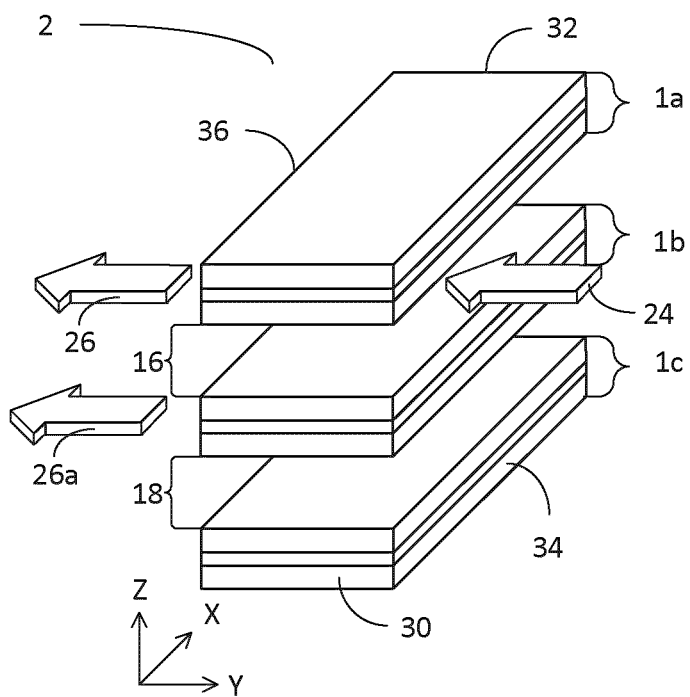
FIG. 3b is a perspective view of an exemplary parallel passage contactor such as illustrated in FIG. 2, illustrating fluid flows during a desorbing step of an adsorptive gas separation process according to an embodiment of the present invention.

FIG. 3b illustrates parallel passage contactor 2 during an admitting step for admitting a desorption or regeneration fluid stream, and a recovering step for recovery of a second product stream of an adsorptive gas separation process according to an embodiment of the present invention. In one such embodiment, a first fluid passage 16 and a second fluid passage 18 may optionally be substantially fluidly separated, substantially within parallel passage contactor 2, such as by walls or other fluid constraints (not shown in FIGS. 2, 3a, and 3b) at longitudinal facets, for example, first facet 30 and second facet 32, and lateral facets, for example, third facet 34 and fourth facet 36, of parallel passage contactor 2, and by barrier layer 10 situated between first fluid passage 16 and second fluid passage 18. In one embodiment, during an admitting step for admitting a desorption or regeneration stream, for example, step (e) of the adsorptive gas separation process described above, a desorption or regeneration fluid stream 24, for example, a steam stream or other suitable desorption gas stream, may be admitted into a first fluid passage 16 of parallel passage contactor 2, for example, via a third port (not shown in FIGS. 2, 3a, and 3b), configured substantially on a facet, for example, a third facet 34, of parallel passage contactor 2 to flow in a lateral direction substantially parallel along a lateral axis (substantially parallel to the Y axis as illustrated in FIGS. 2, 3a, and 3b) of first fluid passage 16 and parallel passage contactor 2. During a recovering step for recovery of a second product stream, for example, step (h) of the adsorptive gas separation process described above, a second product stream 26 may be recovered from first fluid passage 16 of parallel passage contactor 2, and a second product stream 26a may be recovered from second fluid passage 18 of parallel passage contactor 2, for example, via a fourth port (not shown in FIGS. 2, 3a, and 3b) configured substantially on a facet, for example, a fourth facet 36 of parallel passage contactor 2. Optionally, during a desorbing or regenerating step of the second adsorbent layer, for example, during step (f) of the adsorptive gas separation process described above, and/or during a recovering step for recovery of a second product stream, for example, step (g) of the adsorptive gas separation process described above, a purge fluid stream (not shown in FIGS. 2, 3a, and 3b) may be admitted into second fluid passage 18 of parallel passage contactor 2, via for example, a fifth port (not shown in FIGS. 2, 3a and 3b) configured substantially on third facet 34 or the third port (not shown in FIGS. 2, 3a and 3b), to flow in a lateral direction substantially parallel along a lateral axis (substantially parallel to along the Y axis as illustrated in FIGS. 2, 3a, and 3b). A second opposing facet set may comprise third facet 34 and fourth facet 34 having a distance, for example, a second distance, between third facet 34 and fourth facet 36. In one embodiment, during an admitting step for admitting a desorption or regeneration fluid stream, for example, during step (d) of the adsorptive gas separation process described above and optionally during a desorbing or regenerating step and/or a recovery step for recovering a second product stream, for example, during steps (f) and/or (g) of the adsorptive gas separation process described above, a desorption or regeneration fluid stream 24, and/or optionally a purge fluid stream (not shown in FIGS. 2, 3a, and 3b) may be admitted into a parallel passage contactor 2 to travel through first fluid passage 16 and optionally second fluid passage 18 of parallel passage contactor 2, a lateral or second distance which may be defined as at least one of: distance which one of the desorption, regeneration, or optional purge fluid stream is in contact with one or more adsorbent materials of first adsorbent layer 12 and/or one or more adsorbent materials of second adsorbent layer 14 of parallel passage contactor 2; a distance or length substantially between an inlet port (for example, a third port) and an outlet port (for example, a fourth port) of a parallel passage contactor, a distance or length substantially between an opposing set of facets (for example, second opposing facet set) of a parallel passage contactor; and a distance or length substantially between third facet 34 and fourth facet 36. In one embodiment the longitudinal or first distance is equal to or greater than about the lateral or second distance, or the lateral or second distance is equal to or less than about the longitudinal or first distance.

In an alternative process embodiment, optionally, during an admitting step for admitting a desorption or regeneration fluid stream, for example, step (d) of the adsorptive gas separation process described above, a desorption or regeneration fluid stream 24, for example, a steam stream or other suitable desorption gas stream, may be admitted into a first fluid passage 16 of parallel passage contactor 2, for example, via a third port (not shown in FIGS. 2, 3*a*, and 3*b*), to flow in a substantially longitudinal direction substantially parallel along a longitudinal axis (substantially parallel to the X axis as illustrated in FIGS. 2, 3*a*, and 3*b*) of first fluid passage 16, and parallel passage contactor 2.

In one such embodiment, admitting a desorption or regeneration fluid stream 24 to travel a shorter distance, for example, the above described second distance along or parallel to a lateral axis, relative to a feed stream 20 may advantageously improve the efficiency of a desorbing or regenerating step and adsorptive gas separation process by reducing the duration where the desorption or regeneration fluid stream 24, for example, a steam or other suitable desorption gas stream, is in contact with the adsorbent material of an adsorbent layer, for example, first adsorbent layer 12, and/or reduce the pressure drop or loss across a parallel passage contactor 2 during a desorbing or regenerating step and second product stream recovering step, for example, during step (g) and/or (f). In an exemplary embodiment, a suitable desorption or regeneration fluid stream may comprise a heated carbon dioxide containing desorption stream or a carbon dioxide containing desorption stream at elevated temperatures suitable for desorption of the adsorbed components on an adsorbent material, for example.

In another embodiment a parallel passage contactor comprises a plurality of adsorbent layers having at least one adsorbent material optionally on an adsorbent support (for example, in a form of a cloth, a mesh, or a sheet, optionally comprising a thermally conductive material, for example, a carbon material, a graphene material, a metal material, or other suitable adsorbent support material) and optionally a suitable binder material, a fluid passage interposed between the plurality of adsorbent layers where the plurality of adsorbent layers, and/or at least one adsorbent material on at least one adsorbent support may bound, define, or form at least a portion of at least one fluid passage of the parallel passage contactor; a first port and a second port fluidly connected to the at least one fluid passage, configured on a perimeter of the at least one adsorbent support, adsorbent layer, and/or parallel passage contactor, and separated by a first distance; and a third port and a fourth port fluidly connected to the at least one fluid passage, configured on the perimeter of the at least one adsorbent support, adsorbent layer, and/or parallel passage contactor, and separated by a second distance; and where the first distance is greater than the second distance. Optionally at least one of the first port and the second port is substantially perpendicular to at least one of the third port and the fourth port. Optionally the parallel passage contactor further comprises a plurality of facets at least partially defined by a perimeter of the at least one adsorbent support and/or parallel passage contactor where a facet of the parallel passage contactor may have one of the first port or the second port, and one of the third port or the fourth port.

In one process embodiment, an adsorptive gas separation process for separating at least a first component from a multi-component fluid stream comprises:

admitting the multi-component fluid stream as a feed stream into at least one fluid passage of a parallel passage contactor comprising:

a plurality of an adsorbent layer further comprising at least one adsorbent material optionally on an adsorbent support; at least one fluid passage interposed between the plurality of adsorbent layer (for example, at least partially bound, defined, or formed by at least a portion of plurality of adsorbent layer), adsorbent support, and/or adsorbent materials where the plurality of adsorbent layer, adsorbent support, and/or at least one fluid passage further comprises a longitudinal or first distance and a lateral or second distance; a plurality of facets at least partially defined by the perimeter of the plurality of adsorbent layer and/or adsorbent support; a first port and a second port fluidly connected to the at least one fluid passage and configured on opposing facets or perimeter of the parallel passage contactor and separated by the first distance; and a third port and a fourth port fluidly connected to the at least one fluid passage and configured on opposing facets or the perimeter of the parallel passage contactor separated by the second distance;

contacting the feed stream with the at least one adsorbent material on the plurality of adsorbent layers for substantially the first distance;

adsorbing at least a portion of the first component on the one or more adsorbent material of the plurality of adsorbent layers;

recovering a first product stream at least periodically depleted in the first component relative to the multi-component fluid stream or feed stream from the at least one fluid passage of the parallel passage contactor;

admitting a desorption or regeneration fluid stream, for example, a water stream, a steam stream, an air stream, an inert gas stream, a fluid stream comprising substantially the first component, and a combustion flue gas stream, into the at least one fluid passage of the parallel passage contactor where optionally the desorption or regeneration fluid stream may be at a temperature equal to or greater than about 60° C., preferably equal to or greater than about 80° C., or more preferably equal to or greater than about 100° C.;

contacting the desorption or regeneration fluid stream with the at least one adsorbent material on the plurality of adsorbent layers for substantially the second distance;

regenerating the at least one adsorbent material of the plurality of adsorbent layers (for example, by desorbing at least a portion of the first component adsorbed on the at least one adsorbent material of the plurality of adsorbent layers by at least one desorption or regeneration mechanism including, for example, a temperature swing or a partial pressure swing or a displacement purge), and recovering a second product stream at least periodically enriched in the first component relative to the multi-component fluid stream from the at least one fluid passages of the parallel passage contactor. A perimeter of at least one of the parallel passage contactor, adsorbent support, and/or plurality of adsorbent layers may substantially at least partially define a plurality of facets of the parallel passage contactor where one or more ports may be configured or located on a facet or perimeter of the parallel passage contactor and the one or more ports may be fluidly connected to at least one fluid passage. The longitudinal or first distance may be defined as at least one of: a distance which a fluid stream, for example, a feed stream, may come in contact with an adsorbent material of an adsorbent layer; a distance substantially between an inlet port (for example, a first port) of the parallel passage contactor for admitting and recovering of a fluid stream, for example, for admitting a feed stream and an outlet port (for example, a second port) of the parallel passage contactor, for recovering a first product stream; and/or a distance or length substantially between an opposing set of facets (for example, first opposing facet set) of a parallel passage contactor. The lateral or second distance may be defined as at least one of: a distance which a fluid stream, for example, a desorption, regeneration, or optional purge fluid stream, is in contact with one or more adsorbent materials of the adsorbent layer; a distance or length substantially between an inlet port (for example, a third port) for admitting of a fluid stream, for example, for admitting a desorption, regeneration, or optional purge fluid stream, and an outlet port (for example, a fourth port) of a parallel passage contactor for recovering a fluid stream, for example, for recovering a second product stream; and/or a distance or length substantially between an opposing set of facets (for example, second opposing facet set) of a parallel passage contactor. In one embodiment the longitudinal or first distance is equal to or greater than about the lateral or second distance, or the lateral or second distance is equal to or less than about the longitudinal or first distance. A multi-component fluid stream or feed stream may be admitted into a fluid passage of a parallel passage contactor to flow in a direction substantially parallel to a longitudinal direction of the fluid passage of a parallel passage contactor, and at least one of a desorption or regeneration fluid stream, a purge fluid stream, and/or a cooling fluid streams may be admitted into the fluid passage of a parallel passage contactor to flow in a direction substantially parallel to a lateral direction of the fluid passage of a parallel passage contactor, for example, the multi-component fluid stream or feed stream may be admitted to flow into a fluid passage of a parallel passage contactor in a direction substantially perpendicular to a direction of flow of at least one of a desorption or regeneration fluid stream, a purge fluid stream, and/or a cooling fluid streams. In such an embodiment, a parallel passage contactor may be configured to comprise; a plurality of adsorbent layers defining at least one fluid passage; five or more facets, or particularly six or more facets, which may be at least partially defined by one or more adsorbent layers; at least a first set of opposing facets having a first distance between the opposing facets and a second set of opposing facets having a second distance between the opposing facets, where the first distance is equal to or greater than about the second distance (or the second distance is equal to or less than about the first distance) and the facets of the first and second sets of opposing facets have at least one port fluidly connected to at least one parallel fluid passage for admitting and/or recovering a fluid stream. Optionally the first set of opposing facets and the second set of opposing facets may share a common facet.

The embodiment adsorptive gas separation processes and apparatus as described above may offer advantages (some of which have been mentioned already) including, for example, enable various fluid streams (for example, feed stream, regeneration or desorption fluid stream, and cooling fluid stream) to be admitted and recovered from more than two facets of a parallel passage contactor resulting in, for example, increasing the available space for plumbing, reducing the complexity of the plumbing, enabling a desorption or regeneration fluid stream to travel a shorter distance through a parallel passage contactor while maintaining a desirable longer travel distance of a feed stream through the parallel passage contactor, which may advantageously result in a shorter residence time for a fluid stream, for example, a desorption or regeneration fluid stream, reduced adsorption of undesirable components on the adsorbent material, reduced loss of available adsorbent capacity and reduced pressure drop across the parallel passage contactor for one or more fluid streams (for example, a desorption or regeneration fluid stream and/or a cooling fluid stream).

Any adsorptive gas separator or parallel passage contactor described in any of the above-detailed embodiments may employ any suitable adsorbent materials including but not limited to, for example, desiccant, activated carbon, graphite, carbon molecular sieve, activated alumina, molecular sieve, aluminophosphate, silicoaluminophosphate, zeolite adsorbent, ion exchanged zeolite, hydrophilic zeolite, hydrophobic zeolite, modified zeolite, natural zeolites, faujasite, clinoptilolite, mordenite, metal-exchanged silico-aluminophosphate, uni-polar resin, bi-polar resin, aromatic cross-linked polystyrenic matrix, brominated aromatic matrix, methacrylic ester copolymer, carbon fiber, carbon nanotube, nano-materials, metal salt adsorbent, perchlorate, oxalate, alkaline earth metal particle, ETS, CTS, metal oxide, supported alkali carbonates, alkali-promoted hydrotalcites, chemisorbent, silica, polyethyleneimine doped silica, amine, organo-metallic reactant, and metal organic framework adsorbent materials, and combinations thereof.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the scope thereof (including combinations of various described embodiments or portions thereof). Accordingly, the scope of the invention is to be construed in accordance with the substance defined by the following claims.

What is claimed is:

1. An adsorptive gas separator for adsorptive gas separation of at least a first component from a multi-component fluid stream comprising:
   a plurality of adsorbent structures, said adsorbent structures further comprising:
      a first adsorbent layer having a first permeability value along a z-axis of said first adsorbent layer and a first adsorbent material further comprising:
         a first composition, and
         a first pore size;
      a second adsorbent layer, different than the first adsorbent layer, having a second permeability value along a z-axis of said second adsorbent layer and a second adsorbent material further comprising:
         a second composition, and
         a second pore size;
   wherein at least one of:
      said first permeability value and said second permeability value differ;
      said first composition and said second composition differ;
      said first pore size and said second pore size differ; and said first adsorbent material having a greater hydrophobicity relative to said second adsorbent material;

a barrier layer interposed between said first adsorbent layer and said second adsorbent layer;

a first fluid passage where at least a portion of said first fluid passage is defined by said first adsorbent layer; and a second fluid passage, fluidly separate from the first fluid passage, where at least a portion of said second fluid passage is defined by said second adsorbent layer, and a structure for sealing at least a portion of said first fluid passage, and at least a portion of said second fluid passage, wherein said first fluid passage and said second fluid passage are fluidly separate within said adsorptive gas separator.

2. The adsorptive gas separator of claim 1, wherein said barrier layer comprises a permeability of at least one of, equal to or less than a permeability value of said first adsorbent layer, equal to or less than a permeability value of said second adsorbent layer, or equal to or less than $10^{-6}$ m$^2$.

3. The adsorptive gas separator of claim 1, wherein said first fluid passage and said second fluid passage are fluidly connected to a first port, and a second port, and said first fluid passage is fluidly connected to a third and a fourth port.

4. The adsorptive gas separator of claim 1, wherein said first adsorbent material comprises at least one hydrophobic adsorbent material, an activated carbon adsorbent material, a polyethyleneimine doped silica adsorbent material, and a hydrophobic zeolite adsorbent material; and said second adsorbent material comprises at least one hydrophilic adsorbent material, a zeolite adsorbent material, and a metal organic framework adsorbent material.

5. The adsorptive gas separator of claim 1, wherein said barrier layer comprises a thickness of equal to or less than 1000 μm.

6. The adsorptive gas separator of claim 1, wherein at least one of said first adsorbent layer and/or said second adsorbent layer comprises a thermally conductive materials having a thermal conductivity of equal to or greater than 10 W/m K.

7. The adsorptive gas separator of claim 3 wherein said first port and said second port are fluidly connected to a plurality of said first fluid passages and a plurality of said second fluid passage, said third port and said fourth port are fluidly connected to said plurality of said first fluid passages.

8. The adsorptive gas separator of claim 1, wherein said first fluid passage and said second fluid passage are fluidly connected to a first port, and a second port, and said first fluid passage is fluidly connected to a third port.

9. The adsorptive gas separator of claim 8, wherein said first port and said second port are fluidly connected to a plurality of said first fluid passages and a plurality of second fluid passages, said third port is fluidly connected to said plurality of said first fluid passage.

10. The adsorptive gas separator of claim 1, wherein said first fluid passage is fluidly connected to a first fluid passage admitting port and a first fluid passage recovery port, and said second fluid passage is fluidly connected to a second fluid passage admitting port and a second fluid passage recovering port.

11. The adsorptive gas separator of claim 10, wherein said first fluid passage admitting third port and said first fluid passage recovering port are fluidly connected to a plurality of said first fluid passages, and said second fluid passage admitting port and said second fluid passage recovering port are fluidly connected to a plurality of said second fluid passages.

* * * * *